(No Model.)
J. ELBLEIN.
SAFETY CARRIER FOR LANTERNS.
No. 539,577. Patented May 21, 1895.
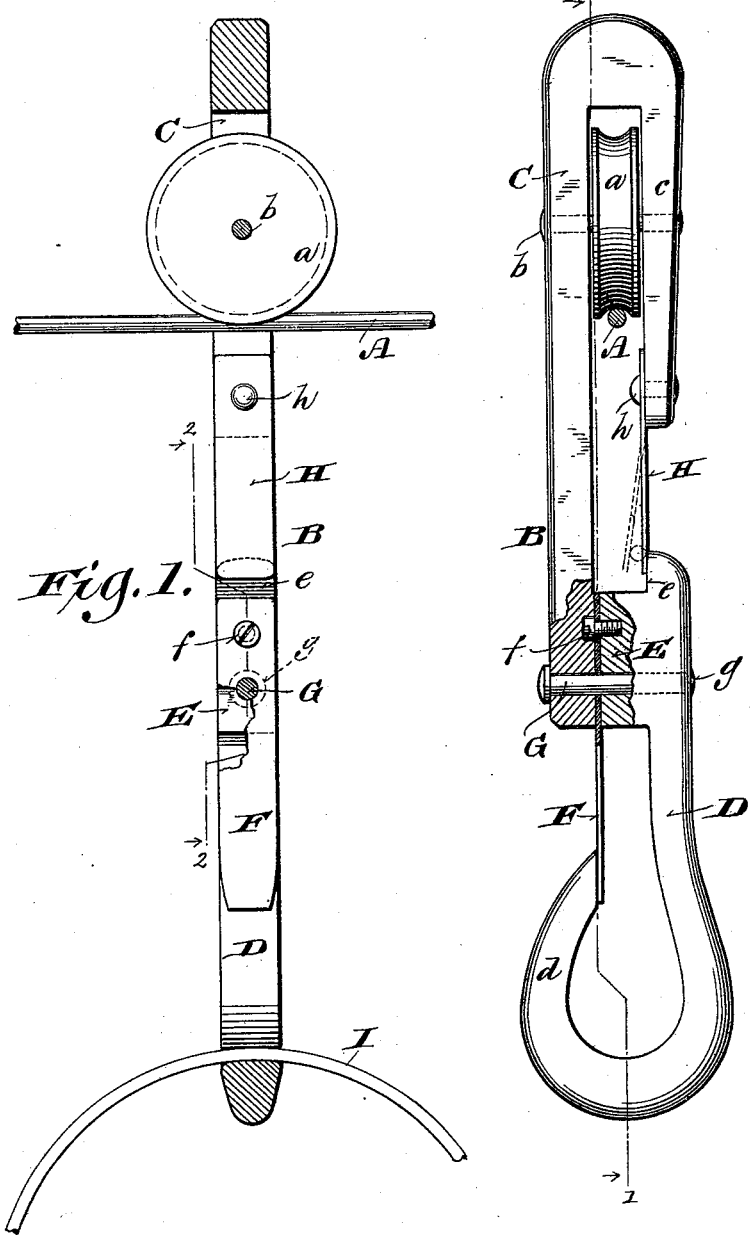
Witnesses:
Geo. W. Young.
Henry Dankert.
Inventor
John Elblein,
By H. G. Underwood
Attorney
THE NORRIS PETERS CO., PHOTO-LITHO., WASHINGTON, D. C.

UNITED STATES PATENT OFFICE.

JOHN ELBLEIN, OF MILWAUKEE, WISCONSIN, ASSIGNOR TO EMIL GUENTHER, OF SAME PLACE.

SAFETY-CARRIER FOR LANTERNS.

SPECIFICATION forming part of Letters Patent No. 539,577, dated May 21, 1895.

Application filed September 4, 1894. Serial No. 521,982. (No model.)

*To all whom it may concern:*

Be it known that I, JOHN ELBLEIN, a citizen of the United States, and a resident of Milwaukee, in the county of Milwaukee, and in the State of Wisconsin, have invented certain new and useful Improvements in Safety-Carriers for Lanterns; and I do hereby declare that the following is a full, clear, and exact description thereof.

My invention relates to safety carriers for lanterns, and consists in certain peculiarities of construction and combination of parts, as will be fully set forth hereinafter and subsequently claimed.

In the drawings, Figure 1 is a vertical sectional representation of my device on the line 1 1 of Fig. 2, the device being shown as partly broken away to illustrate details of construction. Fig. 2 is a representation of said device in side elevation, partly broken away and partly in section, on the line 2 2 of Fig. 1.

Heretofore the use of lanterns in barns, stables, and other places where there was a large quantity of hay, straw, and other readily inflammable substances, generally in a loose condition, has been attended with more or less danger from fire, and it is the primary object of my present invention to reduce this danger to a minimum, as well as to provide simple and efficient means for the attachment of a lantern to, or detachment of the same from, my device, so that the inconvenience of a permanent suspension of the lighting medium may be avoided, to which ends my invention will now be described.

A represents a suitable means of suspension, preferably a wire, though a cord or chain may be employed, having its ends secured to opposite walls or other supports within the structure to be illuminated, and arranged at a convenient height above the floor of the same.

B is the suspension device, proper, comprising a bent hanger, consisting of a long and a short vertical arm, marked C c, respectively, united at the top, and provided with a journal, $b$, on which is supported a pulley, $a$, resting in use on the wire A, as shown.

D represents the shank of a snap-hook, $d$, said shank being formed with an inner offset, or shoulder, $e$, at its upper end, below which is a projecting block or square edged portion of increased width, marked E, to which latter is secured a spring-strip F, which comes in engagement with the point or end of the hook $d$, and completes the snap-hook. In order to prevent the spring-strip from being accidentally turned laterally, it is preferably held by two screws or bolts, though obviously analogous mechanical means to this end might be employed, but I have found those illustrated in the accompanying drawings, comprising a short screw, $f$, passed directly through a perforation in said spring-strip F, and into a screw-threaded socket in the part E, and a longer screw, or bolt, G, passed through registering holes in the lower end of the long arm C of the bent hanger, the spring-strip F, and the upper part of the shank D, through its widest portion, to answer excellently, the end of the bolt, when such is employed, being preferably upset, as shown at $g$.

H is another spring-strip, or snap, secured as shown by the rivet or upset bolt, $h$, to the inner surface of the shorter arm $c$ of the described bent hanger, the lower free end of said strip or snap H being normally in engagement with the described shoulder $e$ of the snap-hook shank D.

I represents part of the ring or handle of a lantern.

The operation of my device will be apparent from the foregoing description of its construction, taken in connection with the accompanying drawings.

In Fig. 1, the method of attachment of a lantern by its top ring or handle loop I is clearly shown, and the same can be readily snapped in or out of my suspension device, at will, in an obvious manner. Similarly, the suspension device, B, with lantern attached, may be readily snapped to place on the wire, cord or chain, A, and when there easily moved to any desired point on the line A, and as easily removed by opening the spring-strip H.

Having thus described my invention, what I claim as new, and desire to secure by Letters Patent, is—

A safety-carrier for lanterns, comprising a two-armed hanger having an anti-friction pulley revolubly supported between said arms, one of said arms being of greater length than the other, a square-edged block secured to the longest of said arms, and having an upward projecting shoulder in line with the shorter of said arms, and a downward projecting hook having an upturned free end, a spring-strip secured to the said shorter arm of the hanger and having its free end in engagement with said shoulder, and another spring-strip interposed between the said longer arm of the hanger and the said block and having its free end in engagement with the said upturned free end of said depending hook, substantially as set forth.

In testimony that I claim the foregoing I have hereunto set my hand, at Milwaukee, in the county of Milwaukee and State of Wisconsin, in the presence of two witnesses.

JOHN ELBLEIN.

Witnesses:
H. G. UNDERWOOD,
HENRY DANKERT.